(12) United States Patent
Hudelson

(10) Patent No.: US 6,394,076 B1
(45) Date of Patent: May 28, 2002

(54) ENGINE CHARGE AIR COOLER

(76) Inventor: Duane L. Hudelson, 3005 S. 7th Ave., Sioux Falls, SD (US) 57105

( * ) Notice: Subject to any disclaimer, the term of this patent is extended or adjusted under 35 U.S.C. 154(b) by 0 days.

(21) Appl. No.: 09/397,264

(22) Filed: Sep. 16, 1999

Related U.S. Application Data

(60) Provisional application No. 60/101,516, filed on Sep. 23, 1998.

(51) Int. Cl.⁷ .................... F01P 3/12; F28F 1/32
(52) U.S. Cl. ............ 123/540; 123/542; 123/563; 123/41.31; 62/323.1; 62/275; 60/599; 165/51; 165/150; 165/163; 165/159
(58) Field of Search .............. 165/51, 163, 150, 165/159; 123/41.31, 542, 563, 540; 60/599; 62/275, 276

(56) References Cited

U.S. PATENT DOCUMENTS

| | | | | | |
|---|---|---|---|---|---|
| 577,894 | A | * | 3/1897 | Wade ................ | 165/159 |
| 1,333,841 | A | * | 3/1920 | Dummer ............ | 165/163 |
| 2,047,249 | A | * | 7/1936 | Ballard ............. | 165/135 |
| 2,399,484 | A | * | 4/1946 | Gunter ............. | 165/163 |
| 2,869,834 | A | * | 1/1959 | Clark, Jr. et al. ... | 165/163 |
| 2,991,048 | A | * | 7/1961 | Rabin .............. | 165/159 |
| 3,050,956 | A | * | 8/1962 | Mann et al. ....... | 62/275 |
| 3,099,914 | A | * | 8/1963 | De Witt et al. .... | 62/275 |
| 3,147,800 | A | * | 9/1964 | Tadewald .......... | 165/150 |
| 3,261,173 | A | * | 7/1966 | Gould .............. | 62/275 |
| 3,577,961 | A | | 5/1971 | Deutschmann | |
| 3,700,029 | A | * | 10/1972 | Thrun .............. | 165/51 |
| 3,748,830 | A | * | 7/1973 | Ross et al. ........ | 165/163 |
| 4,155,337 | A | | 5/1979 | Hensley | |
| 4,683,725 | A | | 8/1987 | Sugiura | |
| 4,823,868 | A | * | 4/1989 | Neebel ............. | 165/51 |
| 4,899,814 | A | * | 2/1990 | Price ............... | 165/163 |
| 4,938,036 | A | | 7/1990 | Hodgkins et al. | |
| 5,156,134 | A | | 10/1992 | Tochizawa | |
| 5,251,603 | A | | 10/1993 | Watanabe et al. | |
| 5,299,633 | A | * | 4/1994 | Brüggemann et al. ...... | 165/150 |
| 5,320,167 | A | * | 6/1994 | Johnson et al. ........... | 62/275 |
| 5,394,854 | A | | 3/1995 | Edmaier et al. | |
| 5,435,289 | A | | 7/1995 | Pendlebury et al. | |
| 5,871,001 | A | | 2/1999 | Pelkey | |
| 5,875,837 | A | * | 3/1999 | Hughes ................... | 165/150 |

FOREIGN PATENT DOCUMENTS

| | | | | | |
|---|---|---|---|---|---|
| DE | 295012 | * | 10/1991 | ............... | 62/275 |
| DE | 4143254 | * | 7/1992 | ............... | 62/275 |
| DE | 004141556 | * | 6/1993 | ............... | 165/150 |
| EP | 0285504 | * | 6/1988 | ............... | 165/159 |
| GB | 648409 | * | 1/1951 | ............... | 165/159 |
| GB | 780082 | * | 7/1957 | ............... | 165/159 |
| GB | 2000583 | * | 1/1979 | ............... | 165/51 |
| JP | 00 87595 | * | 4/1988 | ............... | 165/150 |
| JP | 00 87596 | * | 4/1988 | ............... | 165/150 |
| JP | 4-43278 | * | 2/1992 | ............... | 62/275 |

* cited by examiner

Primary Examiner—John K. Ford

(57) ABSTRACT

An engine charge air cooler system including a charge air compressing system, a refrigerant cycling system, and a charge air cooling apparatus for transferring heat from the compressed charge air of the charge air compressing system to the refrigerant fluid of the refrigerant cycling system. The charge air cooling apparatus comprises a housing with a charge air passage for charge air moving through the housing. A plurality of fins are positioned in the charge air passage. A fluid tube is provided in the housing and passes through each of the fins in a plurality of locations. Preferably, the refrigerant compressor of the system is adapted to also compress a separate flow of refrigerant fluid for an air conditioning system of the vehicle in addition to the refrigerant fluid of the system of the invention. A heating element may be provided in the interior of the housing, and may be selectively heatable for preventing accumulated moisture from freezing in the interior of the housing in sub-freezing temperatures. A desiccant cartridge and purge valve for moisture may also be used.

10 Claims, 2 Drawing Sheets

ENGINE CHARGE AIR COOLER

CROSS REFERENCE TO RELATED APPLICATION

This application claims the benefit of U.S. Provisional Application No. 60/101,516, filed Sep. 23, 1998.

BACKGROUND OF THE INVENTION

1. Field of the Invention

The present invention relates to charge air coolers and more particularly pertains to a new engine charge air cooler for providing enhanced cooling of the charge air received by an engine employing the invention.

2. Description of the Prior Art

The use of charge air coolers is known in the prior art. Specifically, the use of compressors to compress air entering an internal combustion engine is known to increase the power produced by the engine. The compressors, including superchargers and turbochargers, make the air entering the engine denser, and the denser contains more oxygen for combustion with the fuel. The pressurized air flow can also improve fuel atomization and thereby reduce undesirable emissions from the engine. However, compressing the air raises the temperature of the air, which tends to make the air less dense, and can also cause premature detonation of the fuel/air mixture in the engine. Further, a turbocharger, which uses the engine's hot exhaust gases to spin a turbine, tends to transfer heat from the hot exhaust gases to the air being compressed for introduction into the engine.

An intercooler is often interposed in the intake air path between the compressor and the engine for cooling the compressed "charge" air before it is introduced into the engine. Typically, the intercooler is of the "air-to-air" type that uses cooler atmospheric air to absorb some of the heat from the compressed charge air. The "air-to-air" intercooler often relies upon vehicle movement to move or force the cooler atmospheric air through the fins of the intercooler, and thus becomes significantly less effective when the vehicle is not moving.

Further, the ambient temperature of the atmospheric air controls the effectiveness of the intercooler. On warmer days, the atmospheric air has less ability to remove heat from the compressed charge air since the difference in temperatures is less than on cooler days.

Also, the intercooler must be positioned in a location on the vehicle where an uninterrupted flow of cool air is available. This is often accomplished through special ducting in the vehicle (which is common in automobiles) or the placement of the intercooler in front of the engine coolant radiator (which is common in larger trucks). Each of these options has its drawbacks, with the option of mounting the intercooler forward of the radiator producing the undesirable result of reducing the effectiveness of the radiator and making the engine run warmer.

The engine charge air cooler according to the present invention substantially departs from the conventional concepts and designs of the prior art, and in so doing provides an apparatus primarily developed for the purpose of providing enhanced cooling of the charge air received by an engine employing the invention.

SUMMARY OF THE INVENTION

In view of the foregoing disadvantages inherent in the known types of charge air coolers now present in the prior art, the present invention provides a new engine charge air cooler construction wherein the same can be utilized for providing enhanced cooling of the charge air received by an engine employing the invention.

The general purpose of the present invention, which will be described subsequently in greater detail, is to provide a new engine charge air cooler apparatus which has many of the advantages of the charge air coolers mentioned heretofore and many novel features that result in a new engine charge air cooler which is not anticipated, rendered obvious, suggested, or even implied by any of the prior art charge air coolers, either alone or in any combination thereof.

To attain this, the present invention generally comprises an enhanced charge air cooling system for an internal combustion engine in a vehicle. The charge air cooling system comprises a charge air compressing system for providing compressed charge air to an engine intake. The charge air compressing system includes a charge air compressor for compressing atmospheric air received by the compressor and outputting the compressed charge air to the engine intake, a first conduit having a first end in communication of the outlet of the charge air compressor for receiving compressed charge air from the compressor, and a second conduit having a first end and a second end. The second end of the second conduit is in communication with the engine intake for supplying compressed charge air to the engine intake.

The charge air cooling system further comprises a refrigerant cycling system including a refrigerant fluid, a refrigerant compressor for increasing the pressure of refrigerant fluid passing through the compressor, a condenser for removing heat from refrigerant fluid passing through the condenser, and an expansion valve for reducing the pressure of refrigerant fluid passing through the expansion valve.

The charge air cooling system also includes a charge air cooling apparatus for transferring heat from the compressed charge air of the charge air compressing system to the refrigerant fluid of the refrigerant cycling system. The charge air cooling apparatus comprises a housing preferably having a substantially solid exterior wall and a pair of air openings and a pair of fluid openings. A charge air passage for charge air moving through the housing has an air inlet at one of the air openings in the housing and an air outlet at the other of the air openings in the housing. The air inlet is in communication with the second end of the first conduit for receiving compressed charge air from the charge air compressor, and the air outlet of the charge air cooling apparatus is in communication with the first end of the second conduit for discharging charge air to the engine intake.

A plurality of fins are positioned in the charge air passage of the housing such that the compressed charge air passes between the fins between the air inlet and the air outlet of the charge air passage. The fins are preferably oriented substantially parallel to each other, and ideally the fins are thin and elongated.

A fluid tube is provided in the housing with a fluid inlet at one of the fluid openings of the housing and a fluid outlet at the other of the fluid openings of the housing. The fluid inlet is connected to the expansion valve for receiving refrigerant fluid from the expansion valve as a relatively low pressure liquid, and the fluid outlet of the fluid tube is connected to an inlet of the compressor for expelling the fluid as a relatively low pressure gas. Preferably, the fluid tube passes through each of the fins in a plurality of locations, and the fluid tube is formed into a plurality of serpentine coils having straight sections oriented generally perpendicular to the longitudinal extent of the elongate fins.

Preferably, the refrigerant compressor of the system is adapted to also compress a separate flow of refrigerant fluid for an air conditioning system of the vehicle in addition to the refrigerant fluid of the system of the invention.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the providing enhanced cooling of the charge air received by an engine employing the invention of description and should not be regarded as limiting.

As such, those skilled in the art will appreciate that the conception, upon which this disclosure is based, may readily be utilized as a basis for the designing of other structures, methods and systems for carrying out the several providing enhanced cooling of the charge air received by an engine employing the invention of the present invention. It is important, therefore, that the claims be regarded as including such equivalent constructions insofar as they do not depart from the spirit and scope of the present invention.

The use of the invention permits the apparatus cooling the charge air to be placed at a variety of locations inside the engine compartment, regardless of the path of any environmental air flow about the engine compartment.

The use of the invention permits cooling of the charge air without the efficiency of the cooling being significantly affected by the temperature of the ambient environmental air.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
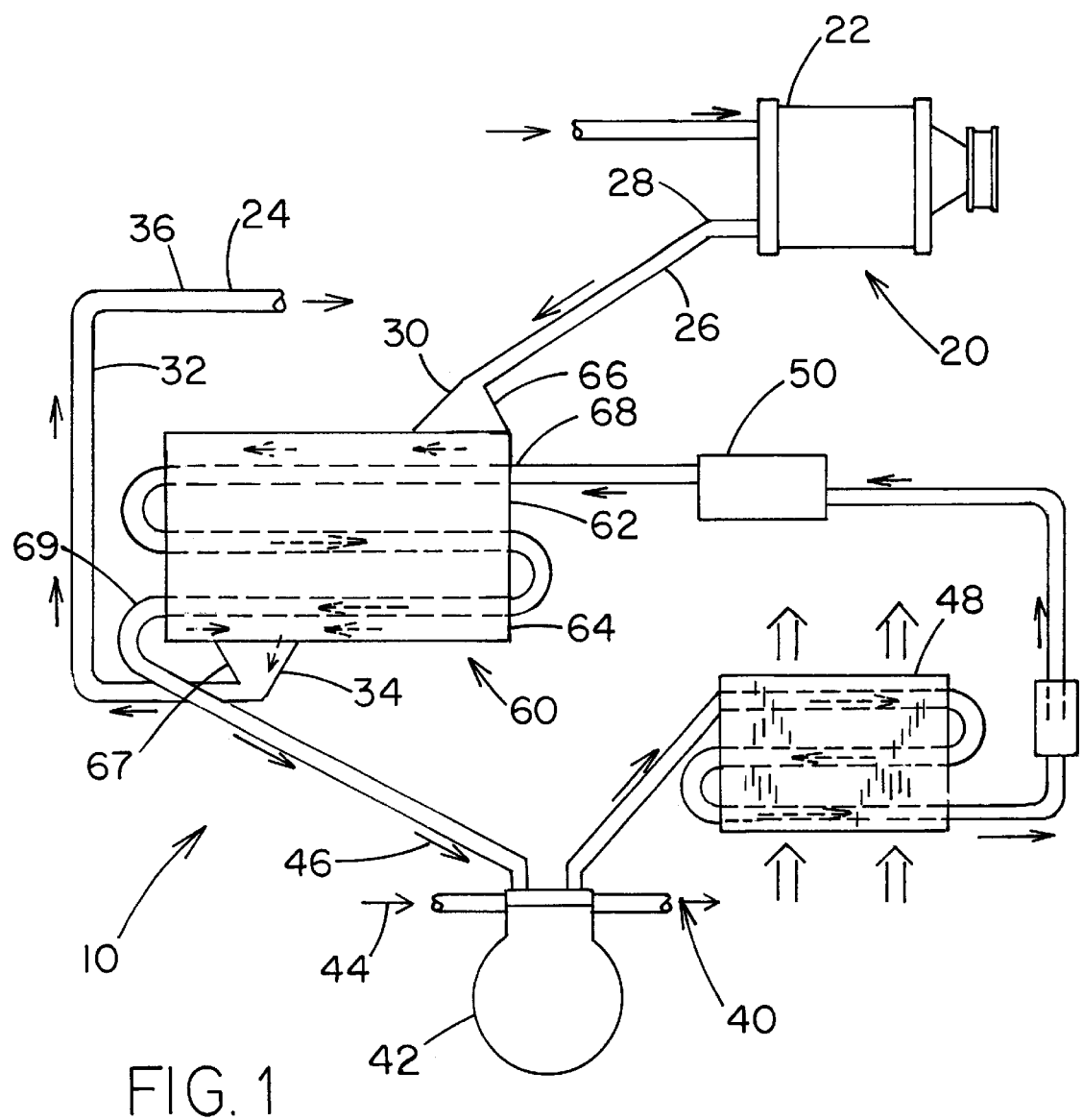
FIG. 1 is a schematic diagram of a new engine charge air cooler according to the present invention.
Figure 2:
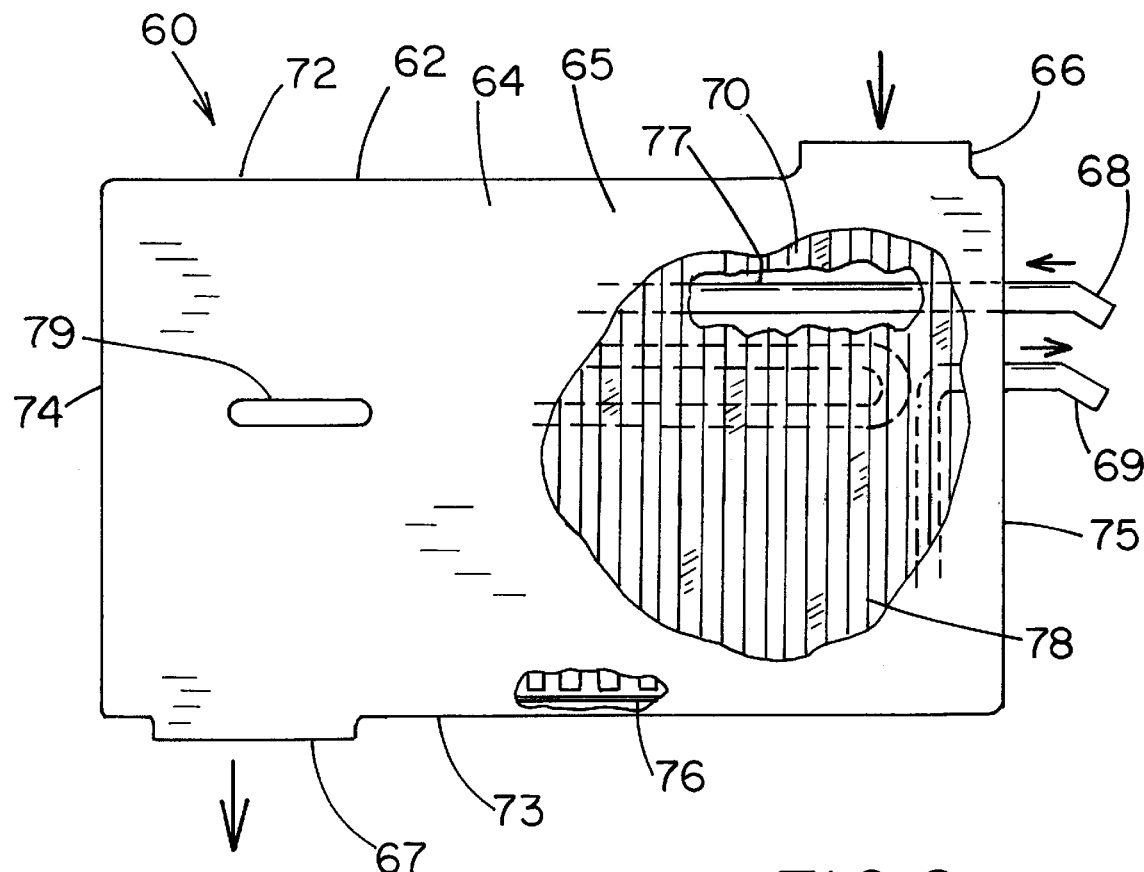
FIG. 2 is a schematic top view of an embodiment of the charge air cooling apparatus of the present invention with a portion of a wall broken away to reveal internal structure of the apparatus.

With reference now to the drawings, and in particular to FIGS. 1 through 2 thereof, a new engine charge air cooler embodying the principles and concepts of the present invention and generally designated by the reference numeral 10 will be described.

As best illustrated in FIGS. 1 through 2, the engine charge air cooling system 10 generally comprising a charge air compressing system 20, a refrigerant cycling system 40, and a charge cooling apparatus 60.

The charge air cooling system 10 of the invention is most suitably employed on an internal combustion engine in a vehicle, although other applications of the invention may also be envisioned by those skilled in the art, such as all applications where compressors are employed to compress air entering an engine.

One portion of the enhanced charge air cooling system comprises the charge air compressing system 20 for providing compressed charge air to an engine intake for combining and combusting with fuel in the engine. The charge air compressing system 20 generally comprises a charge air compressor 22 for compressing atmospheric air received by the compressor 22 and outputting the compressed charge air to the engine intake 24. The charge air compressor may be a supercharger, which is directly driven by the rotation of the engine through belts, chains or gears, or a turbocharger, which is driven by the exhaust gases exiting the engine. The charge air compressor 22 has an inlet for receiving atmospheric air and an outlet for discharging the compressed charge air.

A first conduit 26 connects the compressor 22 and the charge cooling apparatus 60. The first conduit 26 has a first end 28 in communication of the outlet of the charge air compressor 22 for receiving compressed charge air from the compressor. The first conduit 26 also has a second end 30.

A second conduit 32 connects the charge air cooling apparatus and the intake of the engine. The second conduit 32 has a first end 34 and a second end 36. The second end of the second conduit is in communication with the engine intake 24 for supplying compressed charge air to the engine intake.

Another portion of the enhanced charge air cooling system is the refrigerant cycling system 40. The refrigerant cycling system 40 employs a refrigerant fluid, such as, for example, a fluorocarbon compound.

The cycling system 40 includes a refrigerant compressor 42 for increasing the pressure of refrigerant fluid passing through the compressor. The refrigerant compressor 42 may preferably be driven by the engine for greatest efficiency, although may be driven by an electric motor powered by the generating system of the engine or an external battery source, if desired.

In the most preferred embodiment of the invention, the refrigerant leaving the compressor 42 may be divided into dual refrigerant flows, with a primary flow 44 of refrigerant fluid being used in a conventional air conditioning system (not shown) of the vehicle, and a secondary flow 46 of refrigerant fluid being used in the refrigerant cycling system of the invention. Use of the dual refrigerant flows with the separate conventional air conditioning system and the refrigerant cycling system of the invention allows the preservation of the comfort of the air conditioning system in the vehicle, while providing the benefits of the invention for cooling the compressed charge air. Further, the use of a dual refrigerant flows significantly reduces the size of the system, especially when compared to installations where two separate compressors (one of charge air cooling and another for the air conditioning system) are employed, and reduces the numbers of drive belts needed. Further, retrofitting existing systems with dual refrigerant flows is more easily accomplished than adding an additional compressor to the engine that is dedicated to the refrigerant cycling system of the invention. An existing, single flow compressor may thus be used.

The refrigerant cycling system 40 further comprises a condenser 48 for removing heat from the refrigerant fluid passing through the condenser. The refrigerant fluid entering the condenser 48 in a high pressure gas state is converted in the condenser to a liquid state. The condenser 48 receives refrigerant fluid from the compressor 42, or the cycling system portion of the system. The condenser 48 passes the heat removed from the refrigerant fluid to an air flow passing through the condenser.

The refrigerant cycling system 40 also includes an expansion valve 50 for reducing the pressure of refrigerant fluid passing through the expansion valve. The expansion valve 50 receives refrigerant fluid from the condenser 48.

A significant feature of the invention is the charge air cooling apparatus 60 which functions to transfer heat from the compressed charge air of the charge air compressing system 20 to the refrigerant fluid of the refrigerant cycling system 40. The charge air cooling apparatus 60 includes a housing 62 having a substantially solid exterior wall 64 and a pair of air openings 66, 67 and a pair of fluid openings 68, 69. The housing 62 has a pair of face walls 65, and a perimeter wall extending between the face walls. The perimeter wall has a pair of side walls 72, 73 and a pair of end walls 74, 75. One of the air openings 66 is located near a junction of one of the side walls and one of the end walls. The other of the air openings 67 is located near a junction of the other of the side walls and the other of the end walls such that the air openings 66, 67 are located at opposite alternate corners of the housing. The fluid openings 68, 69 may be located in an end wall of the housing 62. However, it will be appreciated by those skilled in the art that other less preferred housing configurations may be employed.

The housing 62 includes a charge air passage 70 through the interior of the housing for movement of the charge air through the housing of the charge air cooling apparatus 60. The charge air passage 70 has an air inlet at one of the air openings 66 in the housing, and an air outlet 67 at the other of the air openings in the housing. The air inlet 66 is in communication with the second end 30 of the first conduit 26 for receiving compressed charge air from the charge air compressor 22 (See FIG. 1). The air outlet 67 of the charge air cooling apparatus is in communication with the first end 34 of the second conduit 32 for discharging charge air to the engine intake 24.

A plurality of fins 78 are positioned in the charge air passage of the housing such that the compressed charge air passes between and around the fins between the air inlet 66 and the air outlet 67 of the charge air passage 70. The fins 78 are oriented substantially parallel to each other. The fins 78 are thin and elongate in a longitudinal direction.

A fluid tube 77 extends through the interior of the housing 62. The fluid tube 77 includes a fluid inlet at one of the fluid openings 68 of the housing and a fluid outlet at the other of the fluid openings 69 of the housing 62. The fluid inlet 68 is connected to the expansion valve 50 for receiving refrigerant fluid from the expansion valve as a relatively low pressure liquid. The fluid outlet 69 of the fluid tube 77 is connected to an inlet of the refrigerant compressor 42 for expelling the fluid as a relatively low pressure gas. The fluid tube 77 passes through each of the fins 78 in a plurality of locations. The fluid tube 77 is formed into a plurality of serpentine coils having straight sections oriented generally perpendicular to the longitudinal extent of the elongate fins 78. The fluid tube 77 in the housing acts as an evaporator which removes heat from the charge air moving through the housing.

Another significant aspect of the invention is a thermostatically-controlled heating element 76 that is located in the interior of the housing 62. The heating element 76 is preferably located at a lower area of the housing interior where moisture is most likely to accumulate, such as, for example, below the fluid tube and fins where moisture dripping off of the fins and fluid tube is likely to accumulate. A thermostat may be positioned in the air path (preferably in the air passage of the housing) for triggering operation of the heating element when the temperature of the air falls below a temperature that is either set at a predetermined level or may be varied upon other operating conditions of the environment or the engine. The heating element 76 may be selectively heated during periods of colder ambient environmental (e.g., sub-freezing) temperatures when moisture carried in the charge air may tend to accumulate, condense and freeze on the interior surfaces of the housing 62 due to the cooling effect of the refrigerant fluid. The heating of the element 76 can reduce the buildup of condensation or even ice that can block the charge air passage 70 and possibly damage the interior structure of the passage. Optionally, a desiccant cartridge (not shown) may be utilized to absorb any accumulated moisture. This cartridge may preferably be located in the housing in a location most suitable for collecting accumulating moisture. The cartridge may also have a purge valve for removing accumulated moisture from the cartridge.

While the housing most preferably is substantially closed by an exterior wall, the housing may have one or more openings through the face walls of the housing that permit some ambient air to move not only over the exterior of the housing but through one or more channels 79 through the housing. The channels 79 are separate from the charge air passage and the fluid tube. The channels 79 give the housing a measure of "air-to-air" heat removal. Optionally, the channels may be covered by panels that are movable to selectively open and close the channels to air flow. These channels may be opened under conditions such as, for example, failure of the refrigerant cycling system. These channels may be most effective when the ambient temperatures are colder, such as in winter. The channels are less effective in when the ambient temperatures are warmer, such as in summer, since air flowing through the channels at warmer ambient temperatures may actually contribute heat to the system rather removing heat from the system.

As a further option, a fan (not shown) may be added to move air through the channels 79 either on a continuous basis or only when a failure of the refrigerant cycling system is detected.

It will be appreciated that the channels 79 through the housing are not in communication with the charge air passage, as the charge air passage must remain sealed from the ambient air to maintain the compression of the charge air between the charge air compressor and the engine intake.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A charge air cooling system for an internal combustion engine in a vehicle, the enhanced charge air cooling system comprising:
   a charge air compressing system for providing compressed charge air to an engine intake for combining and combusting with fuel in the engine, the charge air compressing system comprising:
      a charge air compressor for compressing atmospheric air received by the compressor and outputting the compressed charge air to the engine intake, the charge air compressor having an inlet for receiving atmospheric air and an outlet for discharging compressed charge air;
      a first conduit having a first end in communication of the outlet of the charge air compressor for receiving compressed charge air from the compressor, the first conduit having a second end; and
      a second conduit having a first end and a second end, the second end being in communication with the engine intake for supplying compressed charge air to the engine intake;
   a refrigerant cycling system comprising:
      a refrigerant compressor for increasing the pressure of refrigerant fluid passing through the compressor,
      a condenser for removing heat from refrigerant fluid passing through the condenser; and
      an expansion valve for reducing the pressure of refrigerant fluid passing through the expansion valve;
   a charge air cooling apparatus for transferring heat from the compressed charge air of the charge air compressing system to the refrigerant fluid of the refrigerant cycling system, the charge air cooling apparatus comprising:
      a housing having a substantially solid exterior wall and a pair of air openings and a pair of fluid openings, the housing having a pair of face walls, and a perimeter wall extending between the face walls, the perimeter wall having a pair of side walls and a pair of end walls, the pair of side walls including a top side wall and a bottom side wall;
      a charge air passage through the housing for the charge air moving through the housing of the charge air cooling apparatus;
      a plurality of fins positioned in the charge air passage of the housing such that the compressed charge air passes between and around the fins between the air inlet and the air outlet of the charge air passage; and
   a fluid tube with a fluid inlet at one of the fluid openings of the housing and a fluid outlet at the other of the fluid openings of the housing, the fluid tube passing through each of the fins in a plurality of locations, the fluid tube being formed into a plurality of serpentine coils having straight sections oriented generally perpendicular to the longitudinal extent of the elongate fins;
   wherein the air outlet is positioned in the bottom side wall for facilitating removal of moisture condensing in the interior of the housing in the charge air moving through the air outlet from the interior of the housing.

2. The charge air cooling system of claim 1 wherein the charge air compressor is a supercharger or a turbocharger which has an inlet for receiving atmospheric air and an outlet for discharging compressed charge air.

3. The charge air cooling system of claim 1 wherein the housing of the charge air cooling apparatus has a pair of face walls, and a perimeter wall extending between the face walls, the perimeter wall having a pair of side walls and a pair of end walls, one of the air openings functioning as an air inlet being located near a junction of the top side wall and one of the end walls, the other of the air openings functioning as an air outlet being located near a junction of the bottom side wall and the other of the end walls such that the air openings are located at opposite alternate corners of the housing, the fluid openings each being located in one of the end walls of the housing.

4. The charge air cooling system of claim 1 wherein the charge air passage has an air inlet at one of the air openings in the housing and an air outlet at the other of the air openings in the housing, the air inlet being in communication with the second end of the first conduit for receiving compressed charge air from the charge air compressor, the air outlet of the charge air cooling apparatus being in communication with the first end of the second conduit for discharging charge air to the engine intake.

5. The charge air cooling system of claim 1 wherein the charge air cooling apparatus additionally comprises a heating element located in the charge air passage, the heating element being selectively heatable for heating moisture condensed in the interior of the housing, wherein the heating element is spaced from the plurality of fins in the interior of the housing for heating any moisture collecting in the interior.

6. The charge air cooling system of claim 1 wherein the fluid inlet is connected to the expansion valve for receiving refrigerant fluid from the expansion valve as a relatively low pressure liquid, the fluid outlet of the fluid tube being connected to an inlet of the compressor for expelling the fluid as a relatively low pressure gas.

7. The charge air cooling apparatus of claim 1 additionally comprising a heating element located in the charge air passage, the heating element being selectively heatable for heating moisture condensed in the interior of the housing, wherein the heating element is positioned below the plurality of fins in the interior of the housing for heating any moisture dripping off of said plurality of fins.

8. A charge air cooling system for an internal combustion engine in a vehicle, the enhanced charge air cooling system comprising:
   a charge air compressing system for providing compressed charge air to an engine intake for combining and combusting with fuel in the engine, the charge air compressing system comprising:
      a charge air compressor for compressing atmospheric air received by the compressor and outputting the compressed charge air to the engine intake, the charge air compressor having an inlet for receiving atmospheric air and an outlet for discharging compressed charge air;
      a first conduit having a first end in communication of the outlet of the charge air compressor for receiving compressed charge air from the compressor, the first conduit having a second end; and a second conduit having a first end and a second end, the second end being in communication with the engine intake for supplying compressed charge air to the engine intake;

a refrigerant cycling system comprising:

a refrigerant fluid;

a refrigerant compressor for increasing the pressure of refrigerant fluid passing through the compressor, the refrigerant compressor being driven by the engine;

a condenser for removing heat from refrigerant fluid passing through the condenser such that refrigerant fluid entering the condenser in a gas state is converted to a liquid state, the condenser receiving refrigerant fluid from the refrigerant compressor, the condenser passing the heat removed from the refrigerant fluid to air passing through the condenser; and an expansion valve for reducing the pressure of refrigerant fluid passing through the expansion valve, the expansion valve receiving refrigerant fluid from the condenser;

a charge air cooling apparatus for transferring heat from the compressed charge air of the charge air compressing system to the refrigerant fluid of the refrigerant cycling system, the charge air cooling apparatus comprising:

a housing having a substantially solid exterior wall and a pair of air openings and a pair of fluid openings, the housing having a pair of face walls, and a perimeter wall extending between the face walls, the perimeter wall having a pair of side walls and a pair of end walls, the pair of side walls including a top side wall and a bottom side wall;

a charge air passage through the housing for the charge air moving through the housing of the charge air cooling apparatus, the charge air passage having an air inlet at one of the air openings in the housing and an air outlet at the other of the air openings in the housing, the air inlet being in communication with the second end of the first conduit for receiving compressed charge air from the charge air compressor, the air outlet of the charge air cooling apparatus being in communication with the first end of the second conduit for discharging charge air to the engine intake; wherein one of the air openings functioning as the air inlet is located near a junction of the top side wall and one of the end walls, the other of the air openings functioning as the air outlet is located near a junction of the bottom side wall and the other of the end walls such that the air openings are located at opposite alternate corners of the housing, and wherein the fluid openings are each located in one of the end walls of the housing;

wherein the air outlet is positioned in the bottom side wall for facilitating removal of moisture condensing in the interior of the housing in the charge air moving through the air outlet from the interior of the housing;

a plurality of fins positioned in the charge air passage of the housing such that the compressed charge air passes between and around the fins between the air inlet and the air outlet of the charge air passage, the fins being oriented substantially parallel to each other, the fins being thin and elongate in a longitudinal direction; and a fluid tube with a fluid inlet at one of the fluid openings of the housing and a fluid outlet at the other of the fluid openings of the housing, the fluid inlet being for connecting to the expansion valve for receiving refrigerant fluid from the expansion valve as a relatively low pressure liquid, the fluid outlet of the fluid tube being for connecting to an inlet of the compressor for expelling the fluid as a relatively low pressure gas, the fluid tube passing through each of the fins in a plurality of locations, the fluid tube being formed into a plurality of serpentine coils having straight sections oriented generally perpendicular to the longitudinal extent of the elongate fins.

9. The charge air cooling apparatus of claim 8 additionally comprising a heating element located in the charge air passage, the heating element being selectively heatable for heating moisture condensed in the interior of the housing, wherein the heating element is spaced from the plurality of fins in the interior of the housing for heating any moisture collecting in the interior.

10. The charge air cooling apparatus of claim 8 additionally comprising a heating element located in the charge air passage, the heating element being selectively heatable for heating moisture condensed in the interior of the housing, wherein the heating element is positioned below the plurality of fins in the interior of the housing for heating any moisture dripping off of said plurality of fins.

* * * * *